United States Patent [19]

Huether

[11] Patent Number: 4,861,638
[45] Date of Patent: Aug. 29, 1989

[54] MOLDED ARTICLE MADE OF A COMPOSITE MATERIAL INCLUDING METALS AND NONMETALLIC SUBSTANCES

[75] Inventor: Werner Huether, Karlsfeld, Fed. Rep. of Germany

[73] Assignee: MTU Motoren-und Turbinen-Union Muenchen GmbH, Munich, Fed. Rep. of Germany

[21] Appl. No.: 202,798

[22] Filed: Jun. 3, 1988

[30] Foreign Application Priority Data

Jun. 4, 1987 [DE] Fed. Rep. of Germany ....... 3718677

[51] Int. Cl.$^4$ ................................................ B32B 3/10
[52] U.S. Cl. ........................................ 428/71; 428/73; 428/74; 428/68
[58] Field of Search ...................... 428/76, 71, 72, 74, 428/68, 73

[56] References Cited

U.S. PATENT DOCUMENTS 4,248,925 2/1981 Ambrogi .............................. 428/76
4,626,461 12/1986 Prewo et al. ........................ 428/113

FOREIGN PATENT DOCUMENTS 3323855 11/1984 Fed. Rep. of Germany .
0131630 5/1985 Fed. Rep. of Germany .
3543342 6/1987 Fed. Rep. of Germany .

Primary Examiner—Alexander S. Thomas
Attorney, Agent, or Firm—W. G. Fasse; D. H. Kane, Jr.

[57] ABSTRACT

A composite material of metals and nonmetallic substances exhibits the following structure:
(a) a first material of high mechanical strength and
(b) a second material of high oxidation-resistance, both at elevated temperatures are arranged so that the latter completely envelopes the former.

8 Claims, 1 Drawing Sheet

MOLDED ARTICLE MADE OF A COMPOSITE MATERIAL INCLUDING METALS AND NONMETALLIC SUBSTANCES

FIELD OF THE INVENTION

This invention relates to a molded article made of a composite material including metals and nonmetallic substances.

The present article is intended for use at elevated temperatures, especially those exceeding 1000 centigrade degrees.

BACKGROUND INFORMATION

With known molded articles made of composite materials, especially of metals and nonmetallic substances, a difficulty has been encountered at the above temperature conditions, because the largely differing coefficients of thermal expansion of the various materials present in the composite must be considered and the consequences caused by these differing coefficients must be overcome.

A conventional composite body is not suitable for use at elevated temperatures over extended periods, especially when the metallic component of the composite is exposed, even if only partially, and when the operating environment causes oxidation.

It has therefore been previously attempted to protect metallic materials or composite materials containing metal components from attack by oxidation, by providing the metal component with a protective coating. This protection, however, will last only as long as the protective coating is not destroyed by thermal fatigue and/or mechanical stress. Even minute damage to the protective coating may be sufficient to induce a total failure of the structural member within a very short span of time. This holds true especially when the operating temperature is substantially higher than the temperature at which the material, if unprotected, would inherently resist oxidation.

Fiber-reinforced carbon structural members carrying a protective silicon carbide layer or coating, e.g., have been known to survive service temperatures as high as about 1600 centigrade degrees with the aid of this film-type coating, but when the protective coating was injured, a time of a minute or less was sufficient to cause the component to burn.

OBJECTS OF THE INVENTION

It is an object of the present invention to produce a molded article of a composite material of metals and nonmetallic substances, which article remains operational even at elevated temperatures in excess of 1000 centigrade degrees, especially in excess of 1400 centigrade degrees, and which is suitable for operation in an oxidizing atmosphere, such as air, over the design life of the article.

SUMMARY OF THE INVENTION

According to the invention there is provided a molded article made of a composite material of metals and nonmetallic substances, which is characterized by the following features: a first material 1 of high mechanical strength but low resistance to oxidation at an elevated temperature is completely surrounded by a second material 2 of low mechanical strength and high resistance to oxidation at elevated temperature, said first material 1 being completely surrounded by the second material 2 even if the first material fills only part of the volume of the entire molded article. In a preferred embodiment the first material is provided as members of relatively small volume which are so dimensioned with regard to their length, or width, or thickness that in the direction of one of these dimensions these relatively small components overlap each other in partial areas while in the intermediate spaces the small components are separated from each other by the second material thus forming a running bond.

The primary advantages of the present invention are seen in that a total failure of a structural member within so short a period of time as in the prior art, is now prevented. Failure cannot longer be abrupt, and even following an injury the major portion of the structural member made as taught herein remains intact. Even damage to the material of high oxidation resistance at elevated temperature, can lead only to locally limited attack on the material to be protected namely the core. For causing a total failure, several major injuries will be required.

BRIEF DESCRIPTION OF THE DRAWINGS

Embodiments of the present invention are illustrated schematically by way of example in the accompanying drawings, wherein.

DETAILED DESCRIPTION OF PREFERRED EXAMPLE EMBODIMENTS AND OF THE BEST MODE OF THE INVENTION

Figure 1:
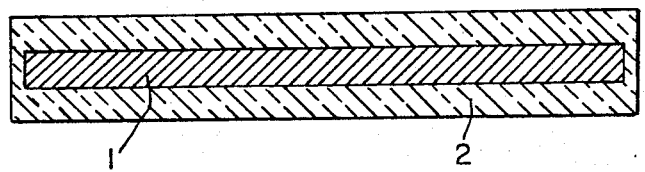
FIG. 1 illustrates a molded body in a multilayer composite forming a laminate.
Figure 2:
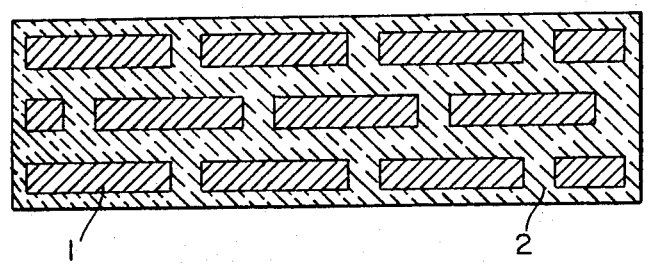
FIG. 2 illustrates a composite material with an alternate structure of the first and second material components.

In the embodiment of FIG. 1, layers in a first material 1 having a high mechanical strength but low resistance to oxidation, alternate with protective layers of a second material 2 of low mechanical strength and high resistance to oxidation at an elevated temperature. In the simplest case it will be sufficient for the laminate to be a sandwich structure with only a single layer of the first material of high strength and low resistance to oxidation enveloped by a jacket of a highly oxidation-resistant second material, also at elevated temperatures. When several layers are sandwiched one over the other, or when they are made to alternate repeatedly, a continually alternating structure of composite material results. In such a structure invariably a totally solid molded article results which is externally enveloped by the more oxidation-resistant second material 2.

Combinations of the first and second materials 1 and 2 are preferably selected such that a good bond results between the two materials 1 and 2. If necessary, however, a bonding coating is applied between the materials 1 and 2. The combination and bond of materials can also be selected such that on the one hand, a good bond between materials 1 and 2 is achieved in partial areas, while in other areas the bond is poor or missing entirely.

A composite material of this description can be manufactured in accordance with a process described in German Patent 3,323,855 (Betz et al.). This process involves steps and areas to respectively promote and prevent adhesion and is applicable with an especially great advantage, to carbon fiber reinforced carbons enveloped by silicon metal or silicon oxide, or SiC, or $Si_3N_4$, glass or glass metal combinations or glass ceramic. These methods can be applied also to metal-fiber reinforced ceramics or ceramic-fiber reinforced ceramics, each externally enveloped with a suitable oxidation-resistant material.

The invention is not restricted to fiber-reinforced composites, since it can also be used to protect layers, sheets, tapes, ribbons, panels, slabs or special sections of metallic material which has the superior mechanical strength at elevated temperatures, by the material of superior oxidation resistance at elevated temperature. The protection is accomplished by employing the construction of the invention to achieve long operational lives of the protected articles.

In a particular aspect of the present invention, metal is spaced apart and enveloped by SiAlON, MCrAlY, $Al_2O_3$ or $Cr_2O_3$ ceramics. This equally applies to St, Cr, Ni, Mo enveloped with MgO, tungsten carbide or a similar material.

Nickel alloys or titanium alloys can externally be enveloped by titanium carbide, titanium silicide, zirconium oxide, ceramics or similar materials. Suitable other materials include other carbides, nitrides or silicides, oxides or combinations thereof, provided they promote adhesion in selected areas and the outer shell is suitably oxidation-resistant and dense, conceivably also smooth to glossy and, e.g. due to a laser-beam finished surface. If desirable, the outer envelope may have a glazed or enameled character, and towards the inside or core of a less oxidation-resistant material it may exhibit a gradient, i.e. vary in its composition continuously from the outside towards the inside from a ceramic or vitreous to a more metallic nature, if the core is metallic or consists of metal fibers or a metal-fiber composite. Also a CFC composite or B-fiber reinforced glass metal composite is suitable.

In one aspect of the invention the first material 1 is selected from the following group of carbon, graphite, and synthetic diamond, while the second material 2 is selected from the group of silicon, silicon dioxide, silicon carbide, silicon nitride, $Si_3N_4$, glass or glass ceramic containing silicon dioxide.

In another aspect of the invention the material 1 of the first group is selected from the metals and metal alloys while the second material 2 is selected from ceramic, cermet, glass, glass ceramic, glass metal composites.

The present composite material can be formed of a first material 1 in the form of sheets, matting, webs, fabric, pile, skeleton, sponge, foam, honeycomb, stacks or sandwiches, wherein its constituent components such as filaments, fibers, wires or sheets have already been soaked, infiltrated or impregnated with the second material 2, or with the bond material before these components of the first material are solidly enveloped or embedded by the second material 2 in a suitable manner.

The present article can take the shape of an endless semi-finished tape type member. In another aspect, the present article may be a structure formed in a mold, whereby the resulting structure may be finished or semi-finished.

The present article is useful as a heat resistant structural member in mechanical engineering including apparatus engineering, in gas turbines, turbine or rocket engines or similar propulsion systems for aircraft or missiles in aerospace applications, especially for combustion chambers, turbine rotors, stators, variable nozzles and other hot gas exhaust parts of vehicles or stationary systems.

Although the invention has been described with reference to specific example embodiments it is to be appreciated that it is intended to cover all modifications and equivalents within the scope of the appended claims.

What is claimed is:

1. A shaped article, comprising a plurality of individual members made of a first material having a high mechanical strength and a low oxidation resistance at high temperatures, a matrix made of a second material having a lower mechanical strength than said first material and a higher oxidation resistance than said first material at said high temperatures, said individual members being fully embedded in said matrix, said individual members being so dimensioned and arranged in rows and staggered columns that the members of one row partially overlap the members of the next row without any contact between said members to form an intermediate space all around each member, said intermediate space being filled by said second material so that said members form a running bond inside said shaped article.

2. The article of claim 1, wherein said members made of said first material are enveloped by said second material forming said matrix by spraying, pressing, or casting.

3. The article of claim 1, wherein said first material of which said individual members are made, is selected from the group consisting of carbon, graphite, and synthetic diamond, and wherein said second material forming said matrix is selected from the group consisting of silicon, silicon dioxide, silicon carbide, silicon nitride $Si_3N_4$, glass, and glass ceramic containing silicon dioxide.

4. The article of claim 1, wherein said first material of said individual members are made, is selected from the group consisting of metal and metal alloys, and wherein said second material forming said matrix is selected from the group consisting of ceramic, cermet, glass, glass ceramic, and glass metal composites.

5. The article of claim 1, further comprising a bonding layer of a third material between said individual members and said matrix.

6. The article of claim 5, wherein said bonding layer has interruptions therein, whereby bonding is prevented or at least reduced at said interruptions.

7. The article of claim 1, wherein said individual members have one of the following forms selected from the group consisting of sheets, matting, netting, fabric, laminate, sponge, foam, honeycomb, each dimensioned to permit said overlap, said forms having been soaked, infiltrated, or impregnated with the second material forming said matrix, or with a bonding third material prior to embedding said individual members in said matrix of said second material.

8. The article of claim 1, when used as a high temperature resistant component.

* * * * *